Sept. 20, 1949.  T. McCONNELL  2,482,424
NAVIGATION INSTRUMENT
Filed Jan. 29, 1946  2 Sheets-Sheet 1
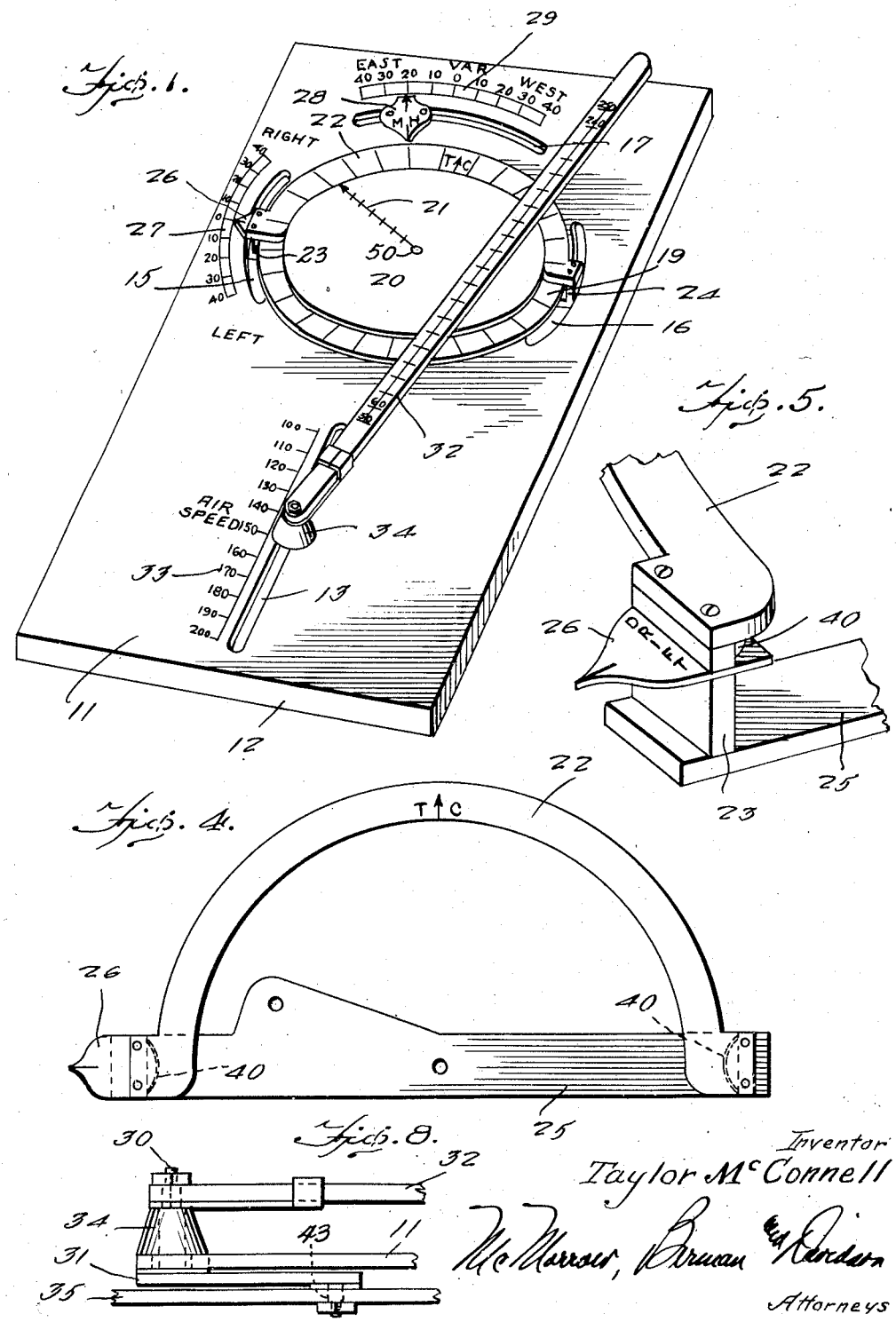
Inventor
Taylor McConnell
Attorneys

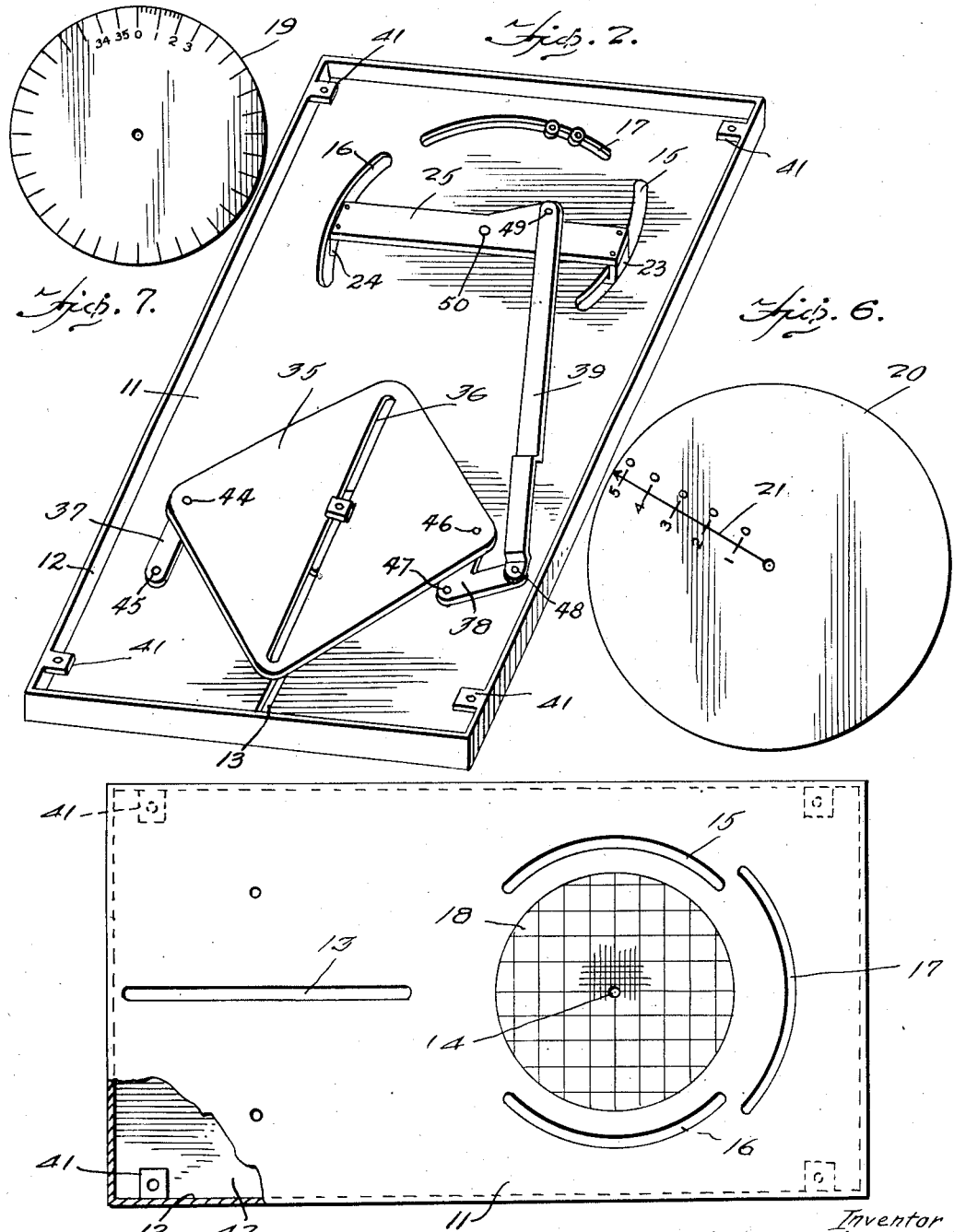

Patented Sept. 20, 1949

2,482,424

UNITED STATES PATENT OFFICE 2,482,424

NAVIGATION INSTRUMENT

Taylor McConnell, Monte Vista, Colo.

Application January 29, 1946, Serial No. 644,077

4 Claims. (Cl. 33—76)

This invention relates to navigation instruments, and more particularly to a mechanical computing device for solving navigational problems for aircraft.

A main object of the invention is to provide a novel and improved mechanical computing structure in a navigational instrument, said structure being very simple, efficient and easy to operate.

A further object of the invention is to provide an improved mechanical calculating device for aircraft navigation wherein by merely setting the device in accordance with known factors such as wind direction and velocity, desired true course, air speed and magnetic variation, the device will indicate directly the ground speed, drift and the required magnetic heading without any additional mental effort on the part of the operator.

Further objects and advantages of the invention will become apparent from the following description and claims and from the accompanying drawings, wherein:

Figure 1 is a perspective top view of a navigation instrument constructed in accordance with the present invention.

Figure 2 is a perspective bottom view of the instrument of Figure 1.

Figure 3 is a top plan view, with a portion shown broken away, of the base member of the instrument of Figure 1.

Figure 4 is a detail plan view of a true course arc member employed in the instrument of Figure 1.

Figure 5 is a detail perspective view of the drift pointer end portion of the arc member of Figure 4.

Figure 6 is a detail plan view of a wind disc member employed in the instrument of Figure 1.

Figure 7 is a detail plan view of a compass disc member employed in the instrument of Figure 1.

Figure 8 is a fragmentary side elevation, illustrating the mounting of the calibrated member and an arm on the base member.

Referring to the drawings, 11 designates a rectangular base member formed with a depending flange 12 around its edges whereby a cavity is provided at the underside of the base member. Base member 11 is formed with an elongated longitudinally extending slot 13 located substantially in the longitudinal axis of member 11. Aligned with slot 13 on said longitudinal axis is an opening 14. Formed in base member 11 with opening 14 as their center are a pair of arcuate slots 15 and 16 disposed on opposite sides of the opening 14 and having a common radius. A third arcuate slot 17 formed on a larger radius with opening 14 as its center is provided in base member 11, said slot 17 being located with its midpoint substantially aligned with opening 14 and slot 13. A coordinate grid circle 18 is marked on the surface of base member 18 with opening 14 as its center.

Pivotally secured in opening 14 on a common pivot pin 50 and relatively rotatable with respect to each other are a compass disc 19 formed of transparent plastic or the like and a wind disc 20 formed of similar transparent material, said wind disc being smaller in radius than the compass disc and overlying the compass disc. The compass disc is graduated at its edge portion with conventional compass rose markings. The wind disc is marked with a radial pointer 21 calibrated along its length in terms of wind velocities, as shown in Figure 6. Overlying the exposed upper edge portion of compass disc 19 is a semi-circular arcuate member 22 formed of transparent plastic or the like. Arcuate member 22 is supported at its end portions by vertical bar members 23, 24 which project through arcuate slots 15 and 16 and are carried by a transverse member 25 pivotally secured to base member 11 at opening 14 at the underside thereof. Arcuate member 22 is marked at its center with a pointer designated "TC," representing "true course."

Vertical bar members 23 and 24 are each provided with leaf spring elements 40 at their upper portions which engage the edge of compass disc 19 with light frictional pressure. Vertical bar member 23 also carries at its upper portion a laterally projecting pointer element 26. Marked adjacent pointer element 26 on base member 11 is an arcuate drift scale 27 calibrated in degrees with its zero point on a radius normal to the longitudinal axis of base member 11 and passing through opening 14.

Slidably positioned in arcuate slot 17 is a pointer member 28. Marked above slot 17 is a magnetic variation scale 29 calibrated in degrees, with the zero point thereof lying in the longitudinal axis of base member 11. Pointer member 28 carries aligned index marks, one mark being adjacent variation scale 29 and the other mark being adjacent the edge of compass disc 19.

Slidably positioned in slot 13 is a bolt member 30 rigidly secured at its lower end to an arm 31 which underlies base member 11. The upper portion of bolt member 30 carries rigidly secured thereto an elongated stick member 32 of transparent plastic or the like, said stick member being calibrated in ground speed units. Adjacent slot 13 the surface of base member 11 is marked with a scale 33 calibrated in air speed units. A conical spacer member 34 is positioned between stick member 32 and base member 11 to maintain stick member 32 in outwardly-spaced parallel relation to base member 11. Stick member 32 overlies the superimposed discs 20 and 19, as shown in Figure 1.

Slidably secured to the free end of arm 31 underneath base member 11 by any suitable means 43 is a plate member 35, said plate member being formed with an elongated diagonal slot 36 through which the sliding connection 43 with arm 31 is made. Plate member 35 is in the form of a quadrilateral polygon. One of the corners of the member 35 is pivotally secured, as at 44 to a first link 37 which is pivotally secured, as at 45 to plate member 11 and an opposite corner is pivotally secured, as at 46, to one arm of a second link or bell crank 38 which is pivotally secured, as at 47, at the fulcrum thereof to plate member 11, said second link being formed with a second arm which is pivotally connected, as at 48, to one end of a third link 39. The opposite end of link 39 is pivoted, as at 49, to transverse member 25 in offset relation to the pivot 50. The linkage is so designed that rotation of stick member 32 through a given drift angle will be transmitted to transverse member 25 by plate member 35 and the link arms in accordance with the drift angle. This rotation moves true course arc 22 and pointer 26 through the same angle, carrying with them the compass disc 19 by virtue of the frictional engagement of leaf springs 40, 40 therewith.

In operation, slidable pointer member 28 is first set to indicate the magnetic variation on scale 29. The slidable end of stick member 32 is set to indicate the air speed on scale 33. The desired true course is set by rotating compass disc 19 relative to arcuate member 22 with the latter set at zero relative to scale 27, until the desired true course appears under the "TC" pointer on arcuate member 22. Wind direction is set by rotating wind disc 20 relative to compass disc 19 and arcuate member 22 until pointer 21 appears adjacent the wind direction value on compass disc 19. The foregoing pre-setting of the instrument need not be made in the order stated above, as obviously the several parts may be pre-set in any order. Speed stick 32 is rotated until its center line intersects the wind velocity value on pointer 21 of wind disc 20. Such rotation of stick 32, through arm 31, plate 35, lever 38, link 39 and transverse member 25 imparts a rotary motion to arcuate member 22 and the associated discs 19 and 20. Without further movement of the parts, the actual magnetic course or heading may then be read from the compass disc value which appears adjacent the lower marking on slidable pointer 28. Drift or drift angle may be read from the value on drift scale 27 which appears adjacent drift pointer 26, and ground speed may be read from the value on speed stick 32 at which the center line of the speed stick intersects the wind velocity value on wind disc 20.

It will be noted that a vector triangle is formed wherein air speed, wind velocity and ground speed are the respective arms of the triangle. The drift angle is the angle between the air speed and the ground speed vectors. The magnetic heading read from the compass disc 19 at the lower index mark on slidable pointer 28 is compensated both for magnetic variation and for the drift angle.

The coordinate grid circle 18 is useful in working problems of relative motion.

Base member 11 may be formed of any suitable material such as sheet metal, plastic, or the like. The depending flange 12 is formed with inwardly directed lugs 41 to which a bottom cover panel 42 is secured.

While specific embodiment of a navigation instrument has been disclosed in the foregoing description, it will be understood that various modifications within the spirit of the invention may occur to those skilled in the art. Therefore it is intended that no limitations be placed on the invention other than as defined by the scope of the appended claims.

What is claimed is:

1. A navigation instrument comprising a base formed with a longitudinal slot calibrated along its length in air speed units, a compass disc pivotally mounted in said base on an axis aligned with said slot, a wind disc pivotally mounted on said axis in overlying relation to and of smaller diameter than said compass disc, said wind disc carrying a radial pointer thereon calibrated along its length in wind velocity units, an elongated stick member slidably and pivotally secured at one end thereof in said longitudinal slots, said stick member being calibrated along its length in ground speed units, a drift pointer rotatably mounted on said axis and frictionally engaging said compass disc, an arcuate scale concentric with said axis positioned adjacent said drift pointer, and an operative connection between said stick member and said drift member whereby rotation of said stick member is operative to rotate said drift pointer, wind disc and compass disc as a unit.

2. The structure of claim 1, and wherein said drift pointer comprises a semi-circular arcuate member overlying the periphery of said compass disc, said semi-circular member carrying a true course indicator.

3. The structure of claim 1, and wherein said drift pointer comprises a semi-circular arcuate member overlying the periphery of said compass disc, said semi-circular member carrying a true course indicator, and wherein said base is formed with an arcuate slot concentric with said axis and adjacent to and of larger radius than said compass disc, said arcuate slot being marked with a magnetic variation scale and having a pointer member slidably mounted therein.

4. A navigation instrument comprising a base member formed with a longitudinal slot calibrated along its length in air speed units, a transparent compass disc pivotally mounted in said base on an axis aligned with said slot, a transparent wind disc pivotally mounted on said axis in overlying relation to said compass disc, said wind disc carrying a radial pointer thereon calibrated along its length in wind velocity units, an elongated stick member slidably and pivotally secured at one end thereof in said longitudinal slot, said stick member being calibrated along its length in ground speed units, a semi-circular arcuate member rotatably mounted on said axis and formed with a drift pointer at one end, a drift scale for said drift pointer, a spring on said arcuate member engaging said compass disc with light frictional pressure, said arcuate member overlying the periphery of said compass disc and carrying a true course mark at its mid-point, said base being formed with an arcuate slot concentric with said axis and adjacent to and of larger radius than said compass disc, said arcuate slot being marked with magnetic variation scale, a pointer member slidably mounted in said arcuate slot, and means for transmitting angular rotation of said stick member to said semi-circular arcuate member, said means for transmitting angular rotation of said stick member to said arcuate member comprising an arm rigidly secured to said stick member on its pivotal axis, a plate member slidably connected to said arm, means for supporting said plate member in a plane parallel to said base member, and a linkage connecting said plate member to said arcuate member.

TAYLOR McCONNELL.

REFERENCES CITED

The following references are of record in the file of this patent:

UNITED STATES PATENTS

| Number | Name | Date |
| --- | --- | --- |
| 1,910,093 | Colvin | May 23, 1933 |
| 1,949,946 | Viehmann | Mar. 6, 1934 |
| 2,004,951 | Jensen | June 18, 1935 |
| 2,296,692 | Thurston | Sept. 22, 1942 |
| 2,334,135 | Thurston | Nov. 9, 1943 |
| 2,377,905 | Sadowsky | June 12, 1945 |
| 2,408,357 | Wolfe | Sept. 24, 1946 |
| 2,438,730 | Watter | Mar. 30, 1948 |